United States Patent [19]

Walters

[11] Patent Number: 4,614,636
[45] Date of Patent: Sep. 30, 1986

[54] 17×17 NUCLEAR FUEL ASSEMBLY THIMBLE TUBE CAP

[75] Inventor: John M. Walters, Orangeburg, S.C.

[73] Assignee: Westinghouse Electric Corp., Pittsburgh, Pa.

[21] Appl. No.: 569,075

[22] Filed: Jan. 9, 1984

[51] Int. Cl.⁴ .............................................. G21C 3/10
[52] U.S. Cl. .................................... 376/451; 376/440
[58] Field of Search ............................... 376/451, 440

[56] References Cited

U.S. PATENT DOCUMENTS 4,189,348  2/1980  Donck ................................ 376/451
4,420,458  12/1983  Dunlap .............................. 376/451

Primary Examiner—Donald P. Walsh

[57] ABSTRACT

A thimble tube cap for replacing conventional thimble tube plugs (18) within thimble tubes (10, 110) of a nuclear reactor fuel assembly is fixedly mounted within a holddown assembly base plate (126) so as to cover the upper end of its associated thimble tube (110) fixedly mounted within the fuel assembly top nozzle adaptor plate (114). An axial through-bore (148) is provided within each cap for controlling the volume flow rate of coolant through the thimble tube (110). Each thimble cap includes a disc-shaped base portion (142) and an upstanding shaft portion (144) integrally formed therewith, an annular ledge or shoulder portion (146) being defined therebetween. When the thimble caps are mounted within the holddown assembly base plate (126), the shoulder portion (146) of each cap engages the undersurface (134) of the holddown assembly base plate (126), while the upper rim portion (152) of each cap is swagingly deformed so as to define an annular boss (154) which engages the upper surface (132) of holddown assembly base plate (126). A countersunk portion (156) of the thimble cap defines a peripheral dependent skirt portion (158) whereby when the cap is seated atop the top nozzle adaptor plate (114), the skirt portion (158) annularly surrounds the upper end of the thimble tube (110) which is welded to the top nozzle adaptor plate (114). The disposition of the thimble cap therefore does not interfere with the weldment (116) between the thimble tube (110) and the top nozzle plate (114).

25 Claims, 4 Drawing Figures

17×17 NUCLEAR FUEL ASSEMBLY THIMBLE TUBE CAP

BACKGROUND OF THE INVENTION

1. Field of the Invention

The present invention relates generally to nuclear reactor fuel assemblies, and more particularly to nuclear reactor fuel assembly thimble tube caps which are operationally associated with the fuel assembly thimble tubes so as to provide the same service functions as the conventional fuel assembly thimble tube plugs without, however, exhibiting the operational disadvantages and impediments characteristic of the thimble tube plug system.

2. Description of the Prior Art

As is well known in the nuclear power plant art, the nuclear reactor core of a typical facility or plant may comprise, for example, at least one hundred or more fuel assemblies, and each fuel assembly, in turn, may comprise, for example, approximately several hundred fuel rods. As an example, a conventional fuel assembly may comprise what is known as a 17×17 array of fuel rods, which means that there are seventeen rows or columns of fuel rods, and each row or column contains seventeen fuel rods. In a similar manner, a multitude of control rods are adapted to be disposed within the fuel assemblies, and accordingly, a symmetrically arranged square array of thimble tubes, within which the control rods are capable of being disposed, are interspersed within the aforenoted array of fuel rods.

Depending upon the power requirements of the particular plant or facility at any particular time, the power output of the power plant or facility is accordingly controlled in the well-known conventional manner through means of the control rods and their disposition within the core fuel assemblies. In particular, not only is the depth to which the control rods are disposed within the fuel assemblies accordingly controlled, but in addition, the number of control rods within particular fuel assemblies is likewise controlled. Specifically, within a typical 17×17 array of fuel rods, provision is made for the accommodation of twenty-four control rods within such a fuel assembly. In accordance with the aforenoted power requirements and corresponding power output of the facility, however, the actual number of control rods employed or disposed within any particular fuel assembly will vary from zero to twenty-four. In those instances wherein control rods are not employed or disposed at specific locations within the fuel assembly, the thimble tubes must be effectively substantially closed in order to prevent any substantial amounts of debris present, for example, within the closed loop coolant system, from collecting within the thimble tubes or other portions of the reactor core. In addition, the volume flow rate of the water coolant through the thimble tubes must be appropriately controlled.

In order to achieve the foregoing operational objectives, thimble plug systems have been conventionally employed in connection with those thimble tubes which do not have control rods operatively associated therewith. With reference being made to FIG. 1 of the drawings, it is seen that each thimble tube plug system comprises a thimble tube 10 which fixedly interconnects the top and bottom nozzles of the fuel assembly with which the thimble tube 10 is operatively associated, it of course being understood that a multitude of thimble tubes 10, and not merely a single thimble tube 10, interconnects the top and bottom nozzles of each fuel assembly. In particular, the upper end of thimble tube 10 is inserted within a bore 12 defined within a top nozle adaptor plate 14 of the fuel assembly and is welded about its periphery to the upper surface of top nozzle adaptor plate 14 as shown at 16. It is noted that the lower end of each thimble tube 10 will also be connected to a bottom nozzle top plate by suitable conventional means, such as, for example, a shoulder bolt threadedly engaged within the thimble tube end plug, not shown.

As has been noted hereinabove, the thimble tubes 10 are adapted to house the reactor control rods, not shown, however, depending upon the particular power requirements of the particular reactor facility, the actual number of control rods employed or disposed within any particular fuel assembly may be less than the corresponding number of thimble tubes 10 within which the control rods are to be housed. In those instances, therefore, wherein control rods are not employed or disposed at specific locations within a particular fuel assembly, thimble plugs 18 have been disposed within the thimble tubes 10 in order to effectively substantially close-off or plug-up the tubes 10 so as to prevent the ingress of any debris, which may be present within the closed loop coolant system, from entering the thimble tubes or other portions of the reactor core and collecting therein.

As seen in FIG. 1, the thimble plugs 18 are substantially cylindrical in configuration and the upper ends of the thimble plugs 18 are provided with an upstanding stem portion 20, the diameter of which is substantially less than that of the main plug body portion 18. In turn, the uppermost portion of the thimble plug 18 is fabricated in the form of an upstanding threaded bolt portion 22 which has a diametrical extent which is less than that of the thimble plug stem portion 20. In this manner, an annular flange or shoulder portion 24 is defined between the thimble plug stem portion 20 and the threaded bolt portion 22. A holddown assembly base plate 26 is disposed in a vertically spaced relationship above the top nozzle adaptor plate 14, and a throughbore 28 is provided within the holddown assembly base plate 26 so as to permit the threaded bolt portion 22 of the thimble plug 18 to pass therethrough. In this manner, a nut 30 may be threadedly engaged with the threaded bolt portion 22 so as to fixedly mount the thimble plugs 18 upon the holddown assembly base plate 26, and it is noted that when the nut 30 is fully threaded and tightened upon thimble plug bolt portion 22, nut 30 engages the upper surface 32 of the holddown assembly base plate 26 while the shoulder portion 24 of the thimble plug 18 engages the undersurface 34 of holddown assembly base plate 26. Lastly, to prevent retrograde movement of the nut 30 relative the threaded bolt 22, and therefore threaded disengagement thereof, a lockwire 36 is inserted within a groove or slot, not shown, defined within the threaded bolt 22 and subsequently welded to the nut 30 as at 38.

While it may therefore be appreciated that the thimble plug systems have served to perform their various designated functions, the thimble plugs 18 are quite expensive to fabricate. In addition, in those instances wherein a substantial number of thimble plugs 18 are utilized in conjunction with a particular fuel assembly, during a refueling operation, when, for example, a particular fuel assembly is being moved from one location within the reactor core to another location within the reactor core, or alternatively, a new or fresh fuel assembly is being inserted within the core, when the holddown assembly base plate 26 is being vertically positioned or adjusted relative to the top nozzle adaptor plate 14 and its thimble tubes 10, it has often proven to be quite difficult to properly align all of the thimble plugs 18 with respect to the thimble tubes 10. Consequently, the efficiency of the refueling operations is often considerably hampered and substantially reduced, particularly when it is remembered that such refueling operations or fuel cycle reloads are all accomplished remotely and under immersed or underwater conditions. Still further, during normal reactor operations when, for example, elevational adjustments of the control rod assemblies are desired to be accomplished in accordance with facility power requirements, it being appreciated that the control rod assemblies are connected to the holddown assembly base plate 26 in a manner similar to that by which the thimble plugs 18 are secured thereto, or alternatively, during the initiation or commencement of refueling operations, difficulty has likewise been experienced in connection with the movement of the thimble plugs 18 within the thimble tubes 10, or in connection with the withdrawal of the thimble plugs 18 from the thimble tubes 10, respectively. This difficulty has apparently developed as a result of debris within the closed loop coolant often becoming wedged between the thimble plugs 18 and the thimble tubes 10, such thereby interfering with the relative movement that may be sought to be accomplished between the thimble plugs 18 and the thimble tubes 10 during the aforenoted operational modes. It is to be noted that in accordance with conventional thimble plug systems, a small annular space 40 is defined between the thimble plugs 18 and the thimble tubes 10 in order to accurately control the volume flow rate of the closed loop coolant system through the thimble tubes, yet despite the provision of such an annular space 40, the aforenoted operational difficulties nevertheless prevail.

Accordingly, it is an object of the present invention to provide new and improved means for closing-off nuclear reactor fuel assembly thimble tubes within which control rods are not employed.

Another object of the present invention is to provide new and improved means for closing-off nuclear reactor fuel assembly thimble tubes within which control rods are not being employed which overcomes the various operational difficulties associated with conventional thimble plug systems.

Yet another object of the present invention is to provide new and improved means for closing-off nuclear reactor fuel assembly thimble tubes within which control rods are not being employed which satisfactorily achieves the operative objectives of conventional thimble plugs without exhibiting the operational disadvantages thereof.

Still another object of the present invention is to provide new and improved means for closing-off nuclear reactor fuel assembly thimble tubes within which control rods are not being employed which are substantially more economical to fabricate than conventional thimble plugs.

Yet still another object of the present invention is to provide new and improved means for closing-off nuclear reactor fuel assembly thimble tubes within which control rods are not being employed which will satisfactorily prevent the ingress of debris, which may be present within the closed loop coolant system, into the thimble tubes and the reactor core.

Still yet another object of the present invention is to provide new and improved means for closing-off nuclear reactor fuel assembly thimble tubes within which control rods are not being employed which will satisfactorily regulate the volume flow rate of the closed loop coolant through the thimble tubes in accordance with conventional closed loop coolant volume flow rate parameters.

A further object of the present invention is to provide new and improved means for closing-off nuclear reactor fuel assembly thimble tubes within which control rods are not being employed which do not present any alignment problems as was characteristic of conventional thimble plug systems.

A yet further object of the present invention is to provide new and improved means for closing-off nuclear reactor fuel assembly thimble tubes within which control rods are not being employed which do not present any impediment to the normal elevational adjustment of those control rods which may be employed within other fuel assembly thimble tubes.

A still further object of the present invention is to provide new and improved means for closing-off nuclear reactor fuel assembly thimble tubes within which control rods are not being employed which do not interfere with the conventional means for attaching the thimble tubes to the fuel assembly top nozzle adaptor plate.

A yet still further object of the present invention is to provide new and improved means for closing-off nuclear reactor fuel assembly thimble tubes within which control rods are not being employed which are quite simple to attach to the holddown assembly base plate.

A still yet further object of the present invention is to provide new and improved means for closing-off nuclear reactor fuel assembly thimble tubes within which control rods are not being employed which will eliminate the collection of debris within the thimble tubes as was characteristic of conventional thimble plug systems.

SUMMARY OF THE INVENTION

The foregoing and other objectives are achieved in accordance with the present invention through the provision of nuclear reactor fuel assembly thimble tube caps which include a disc-type base portion having an upstanding shaft portion integrally formed therewith in a coaxial manner. The diametrical extent of the base portion of each cap is substantially greater than that of the upstanding shaft portion, and consequently, an annular shoulder portion is defined therebetween whereupon each cap is able to be firmly seated upon, or engaged with, the undersurface of the holddown assembly base plate. In addition, the undersurface of the cap base is recessed or countersunk so as to provide an annular dependent skirt portion which is adapted to be seated atop the fuel assembly top nozzle adaptor plate and which annularly surrounds the weld connection formed between the upper end of the thimble tube and the top nozzle adaptor plate. The cap shaft portion extends upwardly through the through-bore conventionally provided within the holddown assembly base plate, and within which the thimble plug threaded bolt portion would normally have been disposed, and the upper end of the cap shaft portion may then be suitably deformed so as to form a radially outwardly extending flared boss which engages the upper surface of the holddown assembly base plate thereby securing the cap within the holddown assembly base plate. An axial through-bore is defined within each cap for controlling the volume flow rate of the closed loop coolant passing therethrough and therefore through the thimble tubes.

In the instance that some control rods are being employed within a particular fuel assembly, that is, at least two control rods, then sufficient alignment between the holddown assembly base plate and the thimble tube caps thereof will be provided by means of such control rods relative to the fuel assembly top nozzle adaptor plate and the thimble tubes mounted therein. Under such circumstances, proper alignment of all of the thimble tube caps relative to their respective thimble tubes will in fact be achieved. In the instance, however, wherein no control rods are to be employed within a particular fuel assembly, then at least two conventional thimble plugs must be retained within the particular fuel assembly for achieving such alignment requirements between the thimble tube caps and their respective thimble tubes. It is to be remembered and appreciated that in view of the fact that the thimble tube plugs, control rods, and the thimble tube caps of the present invention are all adapted to be mounted within the same through-bores defined within the fuel assembly holddown assembly base plate, the thimble tube caps of the present invention are able to be provided within existing fuel assemblies in a retrofitting manner without the requirement of any modification to existing equipment, hardware, or system structural components.

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENT

Figure 1:
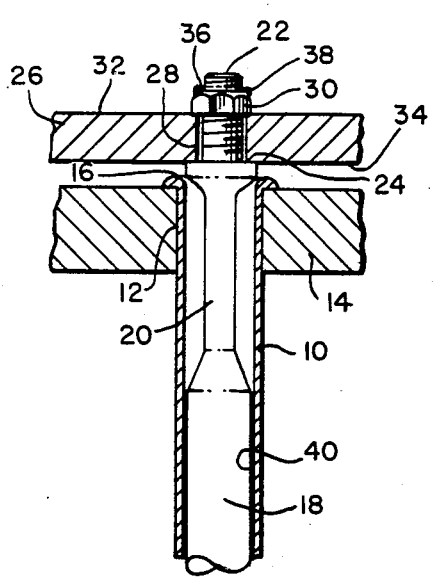
FIG. 1 is a vertical cross-sectional view of the conventional prior art nuclear reactor fuel assembly thimble tube plug system showing the cooperative parts thereof.
Figure 2:
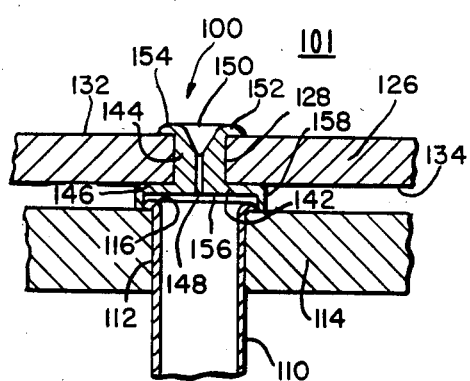
FIG. 2 is a view similar to that of FIG. 1 showing, however, the new and improved nuclear reactor fuel assembly thimble tube cap system constructed in accordance with the present invention and showing the cooperative parts thereof.

Referring now to the drawings, and more particularly to FIG. 2 thereof, there is shown the new and improved nuclear reactor fuel assembly thimble tube cap system generally indicated by the reference character 100. It is initially noted at this juncture that all of the component parts of the nuclear reactor fuel assembly thimble tube cap system as disclosed in FIG. 2 which correspond to similar parts disclosed within the conventional nuclear reactor fuel assembly thimble tube plug system of FIG. 1 have been given similar reference character numbers with the exception that they are now in a "100" series.

As has been noted hereinabove, the thimble tube caps of the present invention have been developed in order to operationally replace substantially all of the conventional thimble tube plugs 18 under those instances within a particular fuel assembly wherein no control rods are being employed, or alternatively, in order to in fact operationally replace all of the conventional thimble tube plugs 18 under those operational circumstances characteristic of a particular fuel assembly wherein at least two control rods are being employed. Under those circumstances, then, wherein a thimble tube cap of the present invention is in fact replacing a thimble tube plug 18 at a particular thimble tube location within a particular fuel assembly, it will be appreciated that the conventional thimble tube plug 18, as well as its associated nut 30 and lockwire 36, has been removed from the thimble tube 10 and the holddown assembly base plate 26, respectively, and replaced by means of the thimble tube cap of the present invention which is seen to comprise a substantially discshaped base portion 142 which has integrally formed therewith a coaxially disposed upstanding shaft portion 144. The diametrical extent of the base portion 142 is substantially greater than that of the shaft portion 144, and therefore, an annular ledge or shoulder portion 146 is defined about the lower end of the shaft portion 144. Each cap is provided with an axial through-bore 148 for controlling the volume rate of the closed loop coolant passing upwardly through its associated thimble tube 110 during reactor operation, in much the same manner as did the annular space 40 defined about the thimble plug 18 when disposed within the thimble tube 10 of the thimble plug system of FIG. 1, and it is seen from FIGS. 2 and 3 that the upper end of bore 148 opens into a funnelconfigured region 150. The funnel region 150 is defined within an annularly shaped upper rim portion 152 of the cap.

Figure 3:
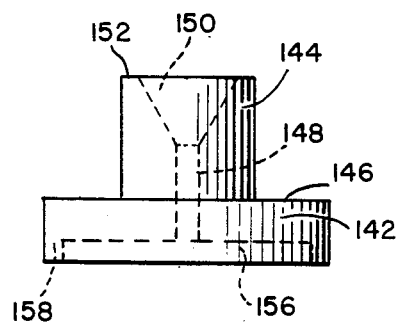
FIG. 3 is a side elevational view of the new and improved nuclear reactor fuel assembly thimble tube cap of the present invention.
Figure 4:
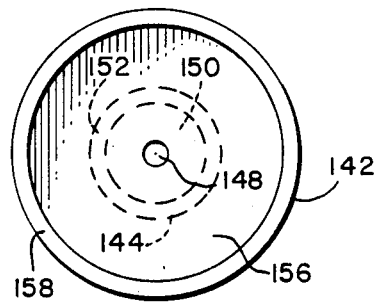
FIG. 4 is a bottom plan view of the nuclear reactor fuel assembly thimble tube cap of FIG. 3.

In utilizing each thimble tube cap of the present invention within the thimble tube cap system 100, a cap such as that illustrated within FIG. 3 will be inserted upwardly from a position beneath holddown assembly base plate 126 and through a through-bore 128 of holddown assembly base plate 126 which is to be coaxially aligned with a thimble tube 110 fixedly secured within the fuel assembly top nozzle adaptor plate 114 by means of a peripheral weld as at 116. The cap is inserted within the bore 128 of holddown assembly base plate 126 until the annular ledge or shoulder portion 146 thereof engages the undersurface 134 of holddown assembly base plate 126 whereupon the upper rim portion 152 of the cap may be deformed in a radially outwardly flared mode so as to engage the upper surface 132 of holddown assembly base plate 126 and form a raised boss with respect thereto as shown at 154. In this manner, each of the caps is securely affixed within the holddown assembly base plate 126.

Continuing further, when the holddown assembly base plate 126 is properly located relative to the fuel assembly top nozzle adaptor plate 114, each of the caps which will be coaxially aligned with its respective thimble tube 110 must not interfere with, and must in face accommodate, the upper end of the thimble tube 110 which is welded to the fuel assembly top nozzle adaptor plate 114 as disclosed at 116. Consequently, each thimble tube cap of the present invention is further provided with an upwardly recessed or countersunk portion 156 whereby a dependent skirt 158 is defined about the periphery of the base 142. The inside diameter of the skirt 158 is just slightly greater than the outer diameter of the peripheral weld 116 defined between the thimble tube 110 and the fuel assembly top nozzle adaptor plate 114, and in this manner, the thimble tube cap of the present invention accommodates the weld attachment of its associated thimble tube 110 when the holddown assembly base plate 126 and its thimble tube caps are positioned relative to the fuel assembly top nozzle adaptor plate 114. When so disposed, it is seen that each thimble tube cap of the present invention will have the bottom rim portion of skirt 158 seated atop the fuel assembly top nozzle adaptor plate 114 whereby, in accordance with the objectives of the present invention, the upper end of each thimble tube 110 is effectively closed-off except for the coolant flow control bore 148 defined within each thimble tube cap of the present invention.

In accordance with the foregoing, it may thus be appreciated that by means of the thimble tube caps of the present invention, the operational characteristics of conventional thimble tube plugs are preserved, however, the operational disadvantages of such thimble tube plugs have been eliminated. In particular, it is especially noted that the operational differences between conventional thimble tube plugs 18 and the thimble tube caps of the present invention resides in the fact that the thimble tube plugs 18 are adapted to be disposed interiorly of the upper ends of the nuclear reactor fuel assembly thimble tubes 10, whereas the thimble tube caps of the present invention are disposed exteriorly of the nuclear reactor fuel assembly thimble tubes 110. In this manner, the thimble tube caps of the present invention are able to effectively close-off the upper ends of the fuel assembly thimble tubes 110 with which they are operatively associated, however, in view of the fact that the thimble tube caps are disposed exteriorly of the thimble tubes 110, they do not create any drag or frictional forces in connection with the interior sidewall surfaces of the thimble tubes 110. In addition, the alignment problems or difficulties which were heretofore experienced with the nuclear reactor fuel assembly thimble plugs 18 in connection with their placement or disposition within the thimble tubes 10, have been entirely eliminated.

In connection with the proper alignment of the holddown assembly base plate 126 relative to the particular fuel assembly top nozzle adaptor plate 114, and therefore the proper alignment of the thimble tube caps of the present invention with respect to the thimble tubes 110, it is to be noted that in those instances in which at least two control rods, not shown, are to be employed within a particular fuel assembly, and are therefore to be disposed within at least two of the thimble tubes 110, the thimble tube caps of the present invention may in fact be utilized to replace all of the conventional nuclear reactor thimble tube plugs 18 which had heretofore been employed within such fuel assemblies in all of the thimble tube locations which did not have control rods operatively associated therewith. This procedural mode is seen to be viable because if at least two control rods are being employed within a particular fuel assembly, it being remembered that the control rods will be fixedly connected to the holddown assembly base plate 26 in a manner similar to that by which the thimble plugs 18 are secured to holddown assembly base plate 26, then the proper alignment between the holddown assembly base plate 26 or 126 and the control rods, not shown, relative to the thimble tubes 10 or 110 and the fuel assembly top nozzle adaptor plate 14 or 114, will have already been established or defined whereby the thimble tube caps of the present invention will, by definition, also be properly aligned with respect to their respective thimble tubes 110.

In a similar manner, in those instances wherein a particular nuclear reactor fuel assembly does not have any control rods employed in conjunction therewith, or wherein only a single control rod is being employed within the particular fuel assembly, then at least two or one of the conventional thimble tube plugs 18 must be employed under such circumstances, respectively, in order to likewise provide the aforenoted coaxial alignment between the thimble tube caps of the present invention and their respective nuclear reactor fuel assembly thimble tubes 110.

It is also to be noted that in view of the fact that the conventional thimble plugs 18, the fuel assembly control rods, not shown, and the thimble tube caps of the present invention are all provided with upstanding shaft structure having substantially the same diametrical dimension, and which shaft structure is adapted to be disposed within the through-bores 28 or 128 of the holddown assembly base plates 26 or 126, the thimble tube caps of the present invention may easily replace any of the thimble tube plugs 18 as is feasible in accordance with the foregoing employment of predetermined numbers of control rods within a particular fuel assembly, so that in fact the thimble tube caps of the present invention may be utilized, not only within reactor facilities currently under construction or those to be erected in the future, but just as importantly, within existing reactor facilities in accordance with retrofitting techniques or programs.

Lastly, as a result of the external disposition of the thimble tube caps of the present invention relative to the thimble tubes 110 of the fuel assembly with which the caps are operatively associated, and by means of the internal provision of the coolant volume flow rate control passage or bore 148, control of the coolant volume flow rate is in fact able to be achieved without the operational disadvantages attendant such coolant volume flow rate control characteristic of the thimble systems exemplified in FIG. 1.

Obviously, many variations and modifications of the present invention are possible in light of the above teachings. It is therefore to be understood that within the scope of the appended claims, the present invention may be practiced otherwise than as specifically described herein.

It is to be understood that FIG. 2, in showing a vertical cross-sectional view of the nuclear reactor fuel assembly thimble tube cap system 100, thereby depicts a fragmentary segmented elevational view of a portion of the associated nuclear fuel assembly 101.

I claim:
1. A nuclear reactor fuel assembly, comprising:
a top nozzle adaptor plate;
a thimble tube, having an open upper end, fixedly secured within said top nozzle adaptor plate;
a holddown assembly base plate disposed in a spaced relationship above said top nozzle adaptor plate; and
means fixedly secured within said holddown assembly base plate and disposed exteriorly of said thimble tube for substantially closing said open upper end of said thimble tube.
2. A fuel assembly as set forth in claim 1, wherein:

said means comprises a thimble tube cap.

3. A fuel assembly as set forth in claim 1, further comprising:
means defined within said thimble tube closing means for controlling the volume flow rate of coolant through said thimble tube.

4. A fuel assembly as set forth in claim 2, wherein:
said control means comprises a through-bore defined within said closing means.

5. A fuel assembly as set forth in claim 2, wherein:
said thimble tube cap comprises an annular dependent skirt by which said thimble tube cap is seated upon said top nozzle adaptor plate.

6. A fuel assembly as set forth in claim 5, wherein:
said skirt annularly surrounds the upper end of said thimble tube fixedly secured within said top nozzle adaptor plate.

7. A fuel assembly as set forth in claim 1, wherein:
said means comprises a rivet-type thimble tube cap.

8. A fuel assembly as set forth in claim 7, wherein said thimble tube cap comprises:
a base portion;
an upstanding shaft portion integrally formed with said base portion; and
the diametrical extent of said base portion is larger than the diametrical extent of said shaft portion thereby defining an annular ledge or shoulder portion for engaging the underside of said holddown assembly base plate when said thimble tube cap is secured within said holddown assembly base plate.

9. A fuel assembly as set forth in claim 8, further comprising:
boss means defined within the upper part of said upstanding shaft portion of said thimble tube cap for fixedly engaging the upper surface of said holddown assembly base plate.

10. A fuel assembly as set forth in claim 1, wherein:
said means is disposed atop said top nozzle adaptor plate.

11. A fuel assembly as set forth in claim 10, further comprising:
means, defined within said means for closing said thimble tube, for accommodating said thimble tube fixed within said top nozzle adaptor plate.

12. A fuel assembly as set forth in claim 11, wherein:
said means for accommodating said thimble tube comprises a countersunk portion defined within said closing means.

13. A nuclear reactor fuel assembly, comprising:
a top nozzle adaptor plate;
a thimble tube, having an open upper end, fixedly secured within said top nozzle adaptor plate by means of said open upper end;
a holddown assembly base plate disposed in a spaced relationship above said top nozzle adaptor plate and said open upper end of said thimble tube; and
means fixedly secured within said holddown assembly base plate and covering said open upper end of said thimble tube for substantially closing said open upper end of said thimble tube to prevent the ingress of debris into said thimble tube yet permitting a controlled volume flow rate of coolant to pass through and out of said thimble tube.

14. A fuel assembly as set forth in claim 13, wherein:
said means comprises a thimble tube cap.

15. A fuel assembly as set forth in claim 13, wherein:
said means comprises a through-bore through which said coolant passes in said controlled volume flow rate.

16. A fuel assembly as set forth in claim 13, wherein:
said means is seated upon said nozzle adaptor plate so as to annularly surround and enclose said upper end of said thimble tube.

17. A nuclear reactor fuel assembly, comprising:
a top nozzle adaptor plate;
a thimble tube, having an open upper end, fixedly secured within said top nozzle adaptor plate;
a holddown assembly base plate disposed parallel to said top nozzle adaptor plate in a plane vertically spaced above said top nozzle adaptor plate;
a bore defined within said holddown assembly base plate so as to be co-axially aligned with said thimble tube fixedly secured within said top nozzle adaptor plate; and
a thimble tube cap fixedly mounted within said bore of said holddown assembly base plate so as to be seated atop said top nozzle adaptor plate and cover said open upper end of said thimble tube for substantially closing off said open upper end of said thimble tube.

18. A fuel assembly as set forth in claim 17, wherein:
said thimble tube cap has a rivettype structure.

19. A fuel assembly as set forth in claim 17, wherein:
said means is disposed entirely exteriorly of said upper end of said thimble tube.

20. In a nuclear reactor fuel assembly having a top nozzle adaptor plate with a first bore, having a thimble tube disposed in said first bore and fixedly secured to said adaptor plate with said thimble tube including an upper end disposed in said first bore, and having a holddown assembly base plate with a second bore disposed vertically above said first bore of said top nozzle adaptor plate; a fitting, for substantially closing said upper end of said thimble tube, said fitting comprising: a thimble tube cap disposed exteriorly of said thimble tube and said first bore, said thimble tube cap having an upstanding shaft portion disposed in said second bore and attached to said holddown assembly base plate, said thimble tube cap also having an integral base portion radially enclosing said thimble tube and said first bore and contacting said top nozzle adaptor plate.

21. The fitting in the fuel assembly of claim 20, wherein:
the diametrical extent of said base portion of said thimble tube cap is larger than the diametrical extent of said shaft portion of said thimble tube cap thereby defining an annular ledge for engaging the underside of said holddown assembly base plate when said thimble tube cap is attached thereto.

22. The fitting in the fuel assembly of claim 20, wherein:
the upper part of said shaft portion of said thimble tube cap includes boss means for fixedly engaging the upper surface of said holddown assembly base plate.

23. The fitting in the fuel assembly of claim 20, wherein:
said upper end of said thimble tube passes through said first bore and is fixedly secured to said upper surface of said top nozzle adaptor plate, and wherein said base portion of said thimble tube caps includes an annular dependent skirt which annularly surrounds said first bore and said upper end of said thimble tube.

24. The fitting in the fuel assembly of claim 20, wherein:
said thimble tube cap also includes a throughbore for controlling the volume flow rate of coolant through said thimble tube.

25. A fuel assembly as set forth in claim 2, wherein:
said thimble tube cap has a rivet-type construction.

* * * * *